United States Patent Office 2,929,620
Patented Mar. 22, 1960

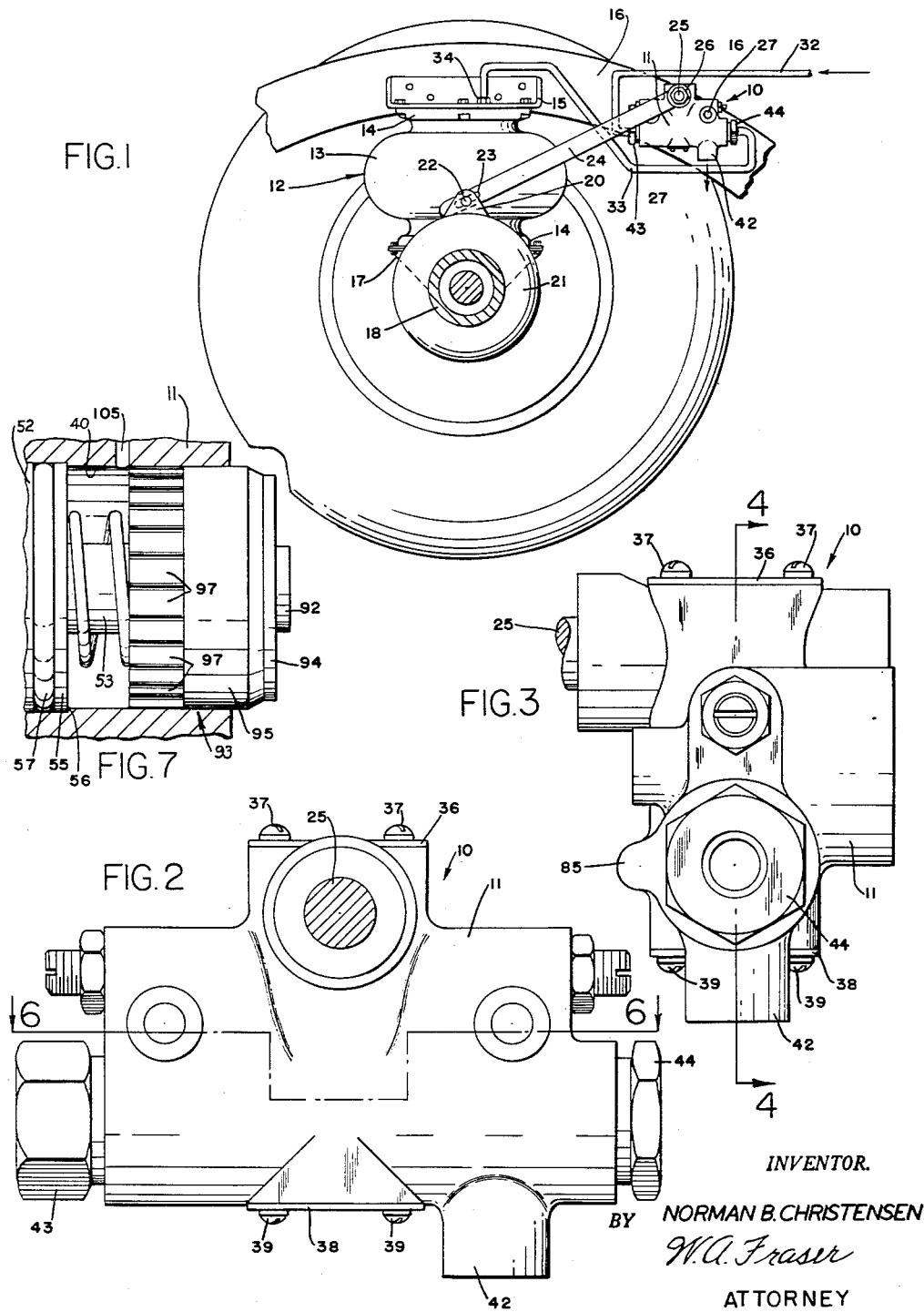

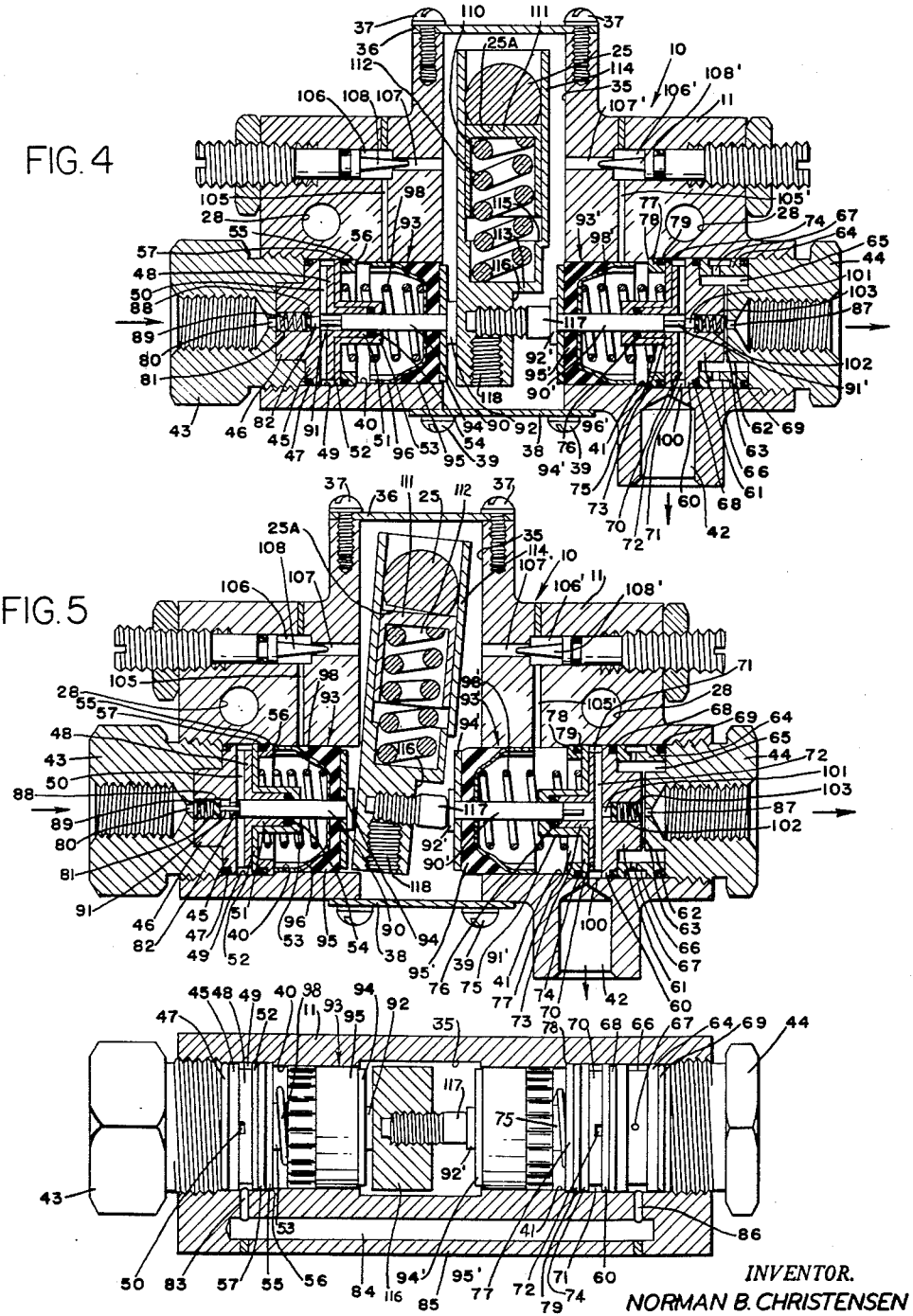

2,929,620

CONTROL DEVICE FOR VEHICLE SUSPENSION

Norman B. Christensen, North Olmsted, Ohio

Application February 13, 1956, Serial No. 565,113

6 Claims. (Cl. 267—65)

This invention relates generally to suspension systems for vehicles. More particularly, the invention relates to pneumatic suspension systems and provides means whereby pneumatic devices, such as bellows type air springs, may be made to respond to increased or decreased vehicle loads causing a substantial change in the riding level of the vehicle, and yet prevent unnecessary alteration of the riding level when the vehicle road gear passes over a bump or drops into a hole, which actions only momentarily alter the load on the suspension system.

Pneumatic suspension systems, incorporating air springs interposed between the vehicle frame and road or running gear, have been slow to achieve commercial success because they have not been provided with satisfactory valve means for controlling and regulating the air cushion within the air springs. Maintaining a constant average air spring length or air cushion under variable static load conditions, will provide a constant riding level for the vehicle.

A satisfactory valve means for effectively controlling the riding level of a vehicle having an air spring suspension, must be responsive to changing static load conditions. An increase in the load will compress the air spring. To restore the air spring to its initial position, air under increased pressure must be admitted into the air spring. A decrease in load will cause the air spring to extend or raise, and therefore, air must be exhausted or vented from within the air spring to restore it to its initial position.

In addition to controlling the supply and exhaust of air to and from an air spring, a satisfactory valve control means must embody therein an adjustable time delay so that momentary alteration of the static load on the suspension system, such as would be encountered during normal axle movement due to road irregularities, will not cause the valve to supply or exhaust air. This time delay feature is often referred to as "damping" and preferably is adjustable over a time range of from 1 to 20 seconds, as determined by the weight of the vehicle, road conditions, etc.

The operation of the valve means also must not be influenced by the natural frequency of the vehicle suspension system which will probably be in the range of from 1 to 2 cycles per second.

Lastly, a satisfactory valve and its control means must be unaffected by and remain operative under extremes of temperature, humidity and exposure to sand, dirt, grease, oil and water.

It is therefore an object of this invention to provide an improved pneumatic suspension system for vehicles, which system includes improved valve and valve control means for controlling and regulating air springs interposed between the vehicle frame and road gear, so as to furnish a constant riding level for the vehicles and a constant average air spring length.

Another object is to provide an improved valve and control means for control and regulation of a vehicle air spring suspension, which controls the supply and exhaust of air to the air springs, has a novel time delay or "damping" feature, and is operative under extremes of temperature, humidity and other environmental conditions.

A further object is to provide an improved valve and control means located remotely of the air springs and embodying therein a novel adjustable time delay or damping component to prevent excessive operation of the valve, which is accurately responsive to persistent changes in vehicle loading, and which is of simple, relatively uncomplex construction.

A further object is to provide a novel time delay or damping mechanism for use with an air spring control valve.

These and other objects will be apparent in view of the following detailed description of the invention considered with the attached drawings:

In the drawings:

Fig. 1 is a vertical sectional view through a vehicle axle showing in elevation a portion of the vehicle equipped with a pneumatic suspension system according to the invention;

Fig. 2 is a side elevation of a valve and control means according to the invention;

Fig. 3 is an end view of the valve and control means;

Fig. 4 is a sectional view, taken substantially on line 4—4 of Fig. 3, showing the valve and control means in the normal position;

Fig. 5 is a view, similar to Fig. 4, showing the valve and control means in an air supplying position;

Fig. 6 is a sectional view, with some parts shown in elevation, taken substantially on line 6—6 of Fig. 2, with the view being rotated approximately 180°; and Fig. 7 is an enlarged fragmentary view of one of the pistons.

In the present invention a ride control valve means, indicated generally by the numeral 10, includes a housing 11, generally rectangular in cross section, which carries a damping means, and an air supply and exhaust control means. The housing 11 is located remotely and laterally of a conventional air spring bellows 12, of multi-ply rubber and cord construction and having one or more convolutions 13. The upper end of the air spring is hermetically fastened by a suitable clamp ring 14 to the underside of a horizontal transverse member 15 constituting a portion of the vehicle frame. The member 15 is securely affixed at either end to longitudinal frame members 16. The lower end of the air spring 12 is also hermetically fastened by a similar clamp ring 14 to the upperside of a bracket 17 on the axle housing 18 of the vehicle road gear. One mode of interposing an air spring between a vehicle frame and road gear has been shown and described. It will be understood, however, that the principles of the invention are applicable to air springs interposed in other ways between the frame and road gear. Also, only one air spring has been shown in connection with this invention, but it will be understood that the invention may be utilized with as many air springs as are required on a vehicle.

A stub flange 20 which may be located atop the vehicle differential housing 21, has a bolt 22 therethrough, which bolt extends through an elongated longitudinal slot 23 formed in the lower end of a control valve actuating rod 24, so that rod 24 is slidably mounted on bolt 22. The upper end of the actuating rod is fixed to one end of a control valve actuating shaft 25 and secured thereon by a nut 26, said shaft being mounted for rotation in housing 11 in a manner to be described. The housing 11 preferably is located above and to the rear of the horizontal plane of the axle, and is fastened by bolts 27, that extend through openings 28 in the housing, to one of the longitudinal frame members 16.

Air, from a source under pressure (not shown), is supplied to the control device 10 by suitable piping 32 having a conventional check valve (not shown) therein so that air cannot back out. The control device is connected by suitable piping 33 to an air spring fitting 34, which extends through the frame member 15 into the interior of the air spring. The piping 33 is the conduit for supplying air to and exhausting air from the air spring 12, through the control device 10, as referred to later.

Referring to Figs. 4, 5 and 6, the housing 11 is provided with a substantially central, vertical bore 35 that extends through the housing, is tightly closed at the top with a plate 36 and bolts 37, and at the bottom with plate 38 and bolts 39. The bore 35 preferably is substantially square in shape, and adjacent its bottom, a pair of horizontal circular bores 40 and 41 communicate with bore 35 on opposite sides thereof.

At the bottom of housing 11, near one end thereof, is an exhaust port 42 which vents air from the air spring 12 to the atmosphere through selected passages in the housing, as will be later described. Threaded into the outer end of the bore 40 is an air supply fitting 43, to which the piping 32 is adapted to be tightly secured. Threaded into the outer end of bore 41, adjacent the exhaust bore 42 and communicating therewith interiorly of the housing, as described later, is a two-way fitting 44 to which the piping 33 leading to the bellows is adapted to be tightly secured.

Inwardly of air supply fitting 43, bore 40 has mounted therein, a valve ring 45 having an outwardly extending hub portion 46 that fits snugly within the shank portion of fitting 43, and which carries an O-ring 47 at its outer periphery to provide a fluid tight seal. Next to ring 45 is an outer circular plate 48 of less diameter than the diameter of bore 40 so as to provide an annular space or passageway 49 around plate 48. The front face of plate 48 is provided with a groove or passage 50 extending thereacross and communicating with space 49. Plate 48 has an inwardly extending hub portion 51 that is apertured with the plate to slidably receive a piston rod, to be referred to later. Next to plate 48 is a supporting plate 52 that has an apertured hub portion 53 surrounding hub 51 of plate 48 to support the latter and slidably receive said piston rod. A small O-ring 54 is placed at the end of hub 53 to provide a fluid tight seal. Next to plate 52 is a ring 55 that engages a shoulder 56 in bore 40 and carries an O-ring 57 at its outer periphery to provide a fluid tight seal. All of the foregoing elements in bore 40 are properly held in place by tightening fitting 43.

Inwardly of the two way fitting 44, bore 41 has mounted therein a valve ring 60, similar to ring 45, having an outwardly extended hub portion 61 that is spaced from the shank portion 62 of fitting 44 to provide a permanent space or passageway 63. As shown, space 63 is obtained by utilizing a relatively wide spacing ring 64 between fitting 44 and ring 60, the inner periphery of ring 64 being spaced from the hub 61 of ring 60 and the shank 62 of fitting 44, so that an annular passage 65 is provided in communication with space 63. Ring 64 is also provided with an annular groove 66 in its outer periphery, and a plurality of radial passages 67 lead from groove 66 to passage 65. O-rings 68 and 69 are carried at the outer peripheries of rings 60 and 64, respectively, to provide fluid tight seals. Next to ring 60 is a circular plate 70, similar to plate 48, of less diameter than the diameter of bore 41, so as to provide an annular space or passageway 71 around plate 70. The outer face of plate 70 is provided with a groove 72 extending thereacross and communicating with space 71. Plate 70 also has an inwardly extending hub portion 73 that is apertured with the plate to slidably receive a second piston rod, to be referred to later. Next to plate 70 is a supporting plate 74, corresponding to plate 52, that has an apertured hub portion 75 surrounding hub 73 of plate 70 to support the latter and slidably receive said second piston rod. A small O-ring 76 is also placed at the end of hub 73 to provide a fluid tight seal. Next to plate 74 is a ring 77, similar to ring 55, that engages a shoulder 78 in bore 41 and carries an O-ring 79 at its outer periphery to provide a fluid tight seal. All of the foregoing elements in bore 41 are properly held in place by tightening fitting 44.

The air supply fitting 43 has a short passage 80 that communicates with a horizontal valve chamber 81 in valve ring 45, and the latter chamber is connected by a small orifice or passage 82 with passage 50 in plate 48. As previously explained, passage 50 communicates with annular passage 49, which also communicates with a short lateral passage 83 (Fig. 6) that leads to one end of an elongated passageway 84 extending transversely of the housing, and which is formed in a lateral extension 85 of housing 11 (Figs. 3 and 6). The other end of passageway 84 communicates with another short lateral passage 86 that leads to annular passage 66. The latter passage is connected by radial passages 67 with annular passage 65 which also connects with passageway 63. Fitting 44 has a short passage 87 that communicates with passageway 63 and leads to the piping connected to the air spring. The foregoing indicates the path of any air under pressure admitted through supply fitting 43.

To control the passage of air under pressure through fitting 43, a valve 88 is seated at the inner end of valve chamber 81, normally closing orifice 82. Valve 88 is in the form of a flat, reinforced, air impermeable disc, and a small coil spring 89 in chamber 81 bearing against the valve has a normal bias tending to keep valve 88 seated.

Valve 88 is adapted to be unseated, to permit air under pressure to pass through the device 10 to the air spring, by the action of a piston rod 90 having a reduced outer end portion 91 that is movable through orifice 82 to engage and unseat the valve under conditions to be described. Piston rod 90 is movable horizontally and is guided in its movement by plate hubs 51 and 53 through which it passes. Rod 90 has an enlarged head 92 on its inner end and carries a piston, indicated in its entirety by the numeral 93, which is movable horizontally in bore 40.

Piston 93 comprises a rear plate 94 contacting head 92, a molded rubber cup 95, preferably formed of neoprene or other suitable material which will not deteriorate in oil, secured to plate 94. The sides of cup 95 slidably engage bore 40 and are held in position against the bore by a preformed copper cup 96, the side of which engages bore 40 and is corrugated to provide a plurality of horizontal passages 97 between the corrugations, for a purpose to be described. A coil spring 98 is arranged between the bottom of cup 96 and plate 52, and this spring tends to hold the piston cups in proper position and to urge the piston and rod toward the right, as seen in Figs. 4 and 5.

Coming now to the passages which permit air to be exhausted from the air spring through the exhaust port 42, the latter opens through a short passage 100 in housing 11 into annular passage 71 in bore 41, which passage connects with passage 72. Valve ring 60 has a small orifice or passage 101 that connects passage 72 with a valve chamber 102, similar to chamber 81, that leads to passage 63, which in turn leads to passage 87 with which the air spring piping 33 is connected. A spring pressed valve 103, identical with valve 88, is mounted in valve chamber 102 and normally seats against orifice 101 to prevent the passage from the air spring.

The means for unseating the valve 103 under conditions to be described, to permit air to exhaust from the air spring, constitutes a piston rod 90' and piston 93' similar in all respects to the piston rod 90 and piston 93 previously described. Hence, to avoid repetition, the same numerals, but primed, will be used to identify the various parts of the second piston rod and piston, and it will be understood that the elements indicated with primed numerals are identical with their unprimed counterparts.

Leading upward from bore 40 is a liquid carrying passage 105 that leads to a valve chamber 106, which is connected to bore 35 by a horizontal passage 107. Mounted in chamber 106 is a needle valve 108 adjustably mounted in housing 11 so as to vary and control the amount of liquid passing the valve from chamber 106 to passage 107 and vice versa.

Leading upward from bore 41 is another liquid carrying passage 105' that connects with a valve chamber 106', which is connected by a horizontal passage 107' with bore 35. Mounted in chamber 106' is a second needle valve 108', also adjustably mounted in housing 11 so as to vary and control the amount of liquid passing valve 108' from chamber 106' to passage 107' and vice versa.

The bore 35 is completely filled with a suitable liquid such as hydraulic brake fluid, which also fills, passages 107 and 107', valve chambers 106 and 106', and passages 105 and 105'. Also the areas between piston cups 96 and 96', and supporting plates 52 and 74, respectively, are filled with this liquid. As described later, movement of either piston outwardly produces an inward movement of the other piston, with consequent movement of the piston rods.

Movement of the pistons and piston rods is initially accomplished by oscillating mechanism actuated by shaft 25. As shown, shaft 25 is suitably journaled for limited rotation in the upper part of housing 11 and extends through bore 35. Both ends of shaft 25 are round so as to turn in its bearings, but within the housing, the shaft is generally semi-circular in section, having a flattened lower surface 25A.

Within the bore 35 is a plunger cup 110, having a closed upper end 111 which contacts shaft 25 and is normally (as shown in Fig. 4) held against the flattened surface 25A. Placed within cup 110 so as to contact the inner surface of the cup end 111, is a coiled, compression, shaft follower spring 112, the lower end of which extends below the open end of the plunger cup, into engagement with the closed lower end 113 of a shaft follower cup 114.

As shown, the cup 110 and spring 112 are movably contained within the follower cup 114, and the latter has an internal shoulder 115 to limit downward movement of cup 110. The cup 114 has a reduced depending extension 116, generally rectangular in section, the lower end of which is in the same horizontal plane as the lower surfaces of bores 40 and 41.

In horizontal alignment with the piston heads 92 and 92', extension 116 receives a threaded horizontal plug 117 that is adjustably mounted in the extension so that the outer face of the plug engages the piston head 92' at the same time that piston head 92 is in engagement with the adjacent surface of extension 116, substantially as indicated in Fig. 4. As soon as plug 117 is properly adjusted, a locking screw 118 that extends upwardly through the lower end of extension 116 is tightened against the threads of the plug to lock the latter in position. Thus, as the lower end of cup 114 turns left or right, as the case may be, in response to turning movement of shaft 25, one of the pistons is moved horizontally by the extension 116 or the plug 117, and the other piston follows in the same direction, by virtue of the action of the springs 98 and 98', and the liquid in the unit.

The operation of the device is as follows:

Let us assume that the normal static load on the vehicle suspension, which in this case is preferably a bus or truck, requires the air springs to be inflated to a pressure of about 50 p.s.i., in which condition the valves 88 and 103 are in the position shown in Fig. 4, that is, seated against the orifices 82 and 101 and preventing air from passing through the chambers 81 and 102.

Now assume that the static load is increased, for example, by adding merchandise or passengers to the vehicle. As the load is increased, the upper frame members 15 and 16 move downwardly toward the axle housing 18, causing the air spring 12 to contract. During this downward movement of the upper frame members, the control device 10 also moves downwardly causing the actuating shaft 25 to be turned by the actuating rod 24, the lower end of which is slidably attached to the differential housing, to permit sliding movement of the rod as the device moves downwardly.

As viewed in Fig. 1, an increased load would cause the shaft 25 to turn in a clockwise direction to supply air under pressure to the air spring 12. Referring to Fig. 5, as shaft 25 is turned clockwise on its axis, the plunger cup 110 will be displaced downwardly within the follower cup 114, compressing further the spring 112. As the spring 112 is compressed, energy stored therein becomes directed substantially equally between the upper end 111 of the plunger cup and the lower end 113 of the follower. The plunger end is fixed by the shaft and cannot be displaced upwardly, though it will immediately move upwardly in the event shaft 25 is turned back even a small degree in a counter-clockwise direction. As the spring 112 is compressed, the follower cup 114 will be caused to turn on the same axis as shaft 25 to assume the position shown in Fig. 5. As the follower cup turns, the side of extension 116 will contact piston head 92 and move piston 93 to the left in bore 40.

As described elsewhere, the space between piston cup 96 and plate 52 is liquid filled. As piston 93 moves to the left, for example, from its Fig. 4 position to its Fig. 5 position, liquid is forced over the front edge of piston cup 96 and into the spaces 97 of said cup, along which spaces it travels to the right in Fig. 5 to vertical passage 105. From the latter passage the liquid flows through the needle valve-controlled passages to passage 105' and thence to the space between piston cup 96' and plate 74. The speed of horizontal movement of piston 93 to the left in Fig. 5 is determined and controlled by the position of the needle valve 108.

As piston 93 moves to the left in Fig. 5, so does piston rod 90 with its reduced end 91, causing valve 88 to be unseated and permitting additional air to pass into valve chamber 81, and then through the various passages to the air spring 12. This additional air must be under a greater pressure than the air already in the air spring 12, and will extend the air spring to its initial position.

As the air spring extends, the upper frame members 15 and 16 move upwardly from the axle housing 18, causing shaft 25 to be turned by the actuating rod 24 in a counter-clockwise direction as viewed in Fig. 5. As shaft 25 begins to assume the normal position shown in Fig. 4, the follower spring 112 will urge the plunger cup 110 upwardly, which action permits the follower cup 114 to begin to assume its normal position. The force which has been directing piston 93 to the left is reversed in direction, the flow of liquid thus being reversed so that the liquid in the area between piston cup 96' and plate 74 will move up passage 105', and liquid will flow down passage 105 into the area between piston cup 96 and plate 52. This action moves piston rod 90 to the right and allows spring 89 to close valve 88, stopping the flow of additional air and maintaining the original position of the air spring. Spring 98 assists in returning piston 93 to its normal position as equilibrium is being reached.

If the static load on the vehicle suspension is decreased, the frame members 15 and 16 move upwardly away from the axle housing 18, causing the air spring 12 to extend. During this upward movement of the frame members, the control device 10 also moves upwardly, causing shaft 25 to be turned by rod 24, in a counter-clockwise direction as viewed in Fig. 4, said rod sliding with respect to the bolt 23 as the device 10 moves upwardly.

As the shaft 25 is turned counter-clockwise on its axis, the ensuing action is identical but opposite to that described in connection with Fig. 5. That is, the follower cup 114 is turned on the same axis as shaft 25, and plug 117 moves piston 93' to the right as viewed in Fig. 4. This displaces fluid from the area between piston cup 96' and plate 74 to the area between piston cup 96 and plate 52, under control of the two needle valves 108 and 108'. As piston 93' moves to the right the reduced end of piston rod 90' unseats valve 103, permitting air to exhaust from the air spring 12, through fitting 44, passage 87, passage 63, chamber 102, orifice 101, passage 72, annular passage 71, passage 100, and the exhaust port 42 to the atmosphere. The exhaust of air from within the spring 12 will contract the air spring to its initial position.

As the air spring contracts, the frame members 15 and 16 move downwardly toward the axle housing 18, causing shaft 25 to be turned by rod 24 in the opposite or clockwise direction. The ensuing action at this point is also identical but opposite to that described in connection with Fig. 5. That is, the force moving follower cup 114 is reversed in direction, and liquid will begin to flow from the area between piston cup 96 and plate 52 to the area between piston cup 96' and plate 74. This action moves piston rod 92' toward bore 35 and allows the spring pressed valve 103 to close, stopping the exhaust of air and maintaining the original position of the air spring. The spring 93' assists in returning piston 93' to its normal position.

When a vehicle equipped with a suspension system according to this invention is driven over rough roads with no change in the static loading, the vehicle wheels will move up and down over bumps and into holes in the road. This causes the shaft 25 to be quickly turned in either direction as the case may be. However, a quick turning of shaft 25 wil not cause the various components of the control device 10 to react to supply or exhaust air because of the damping or time delay effect of the pistons 93 and 93' upon movement of the piston rods 90 and 90'. Thus, the admission of additional air to or exhaust of air from the air spring 12 will not occur until a force is maintained in one direction for a predetermined period of time which can be controlled by the needle valves 108 and 108'. The use of two needle valves, one in connection with each piston, is a feature of this invention, which provides for more accurate selectivity of and more accurate control of the time lag required for damping the movement of the piston rods. Thus, valve openings of different or the same sizes for this passage of liquid during the damping action, may be easily and quickly provided. After the several springs in the device are balanced, it will be found desirable to choose needle valve openings which wil provide a time lag of about 7 seconds before th follower cup 114 wil lmove from the normal or middle position shown in Fig. 4, to either of its tilted positions, one of which is shown in Fig. 5. However, the time delay may be selected from any place within the preferred range of from 1 to 20 seconds.

A shut off valve (not shown) can be provided in the air spring line 33 so that an operator can shut off the line when raising the vehicle by a bumper jack to remove a tire.

While a preferred embodiment of the invention has been shown and described, it will be understood that changes and modifications may be made therein without departing from the spirit of the invention or the scope of the subjoined claims.

What is claimed is:

1. Control means adapted for regulation of the supply and exhaust of air to and from an expansible bellows for a vehicle suspension system to maintain a predetermined height between the road gear and frame of the vehicle, comprising, a housing, said housing having an air supply port, an air exhaust port and a two-way port, with air passageways connecting said supply port with said two-way port and said exhaust port with said two-way port, opposed valves within said housing closing said passageways, opposed pistons located between said valves and movable to open said valves, that portion of the housing between said pistons having walls defining a bore at substantially a right angle to said pistons, a shaft extending transversely of said bore adapted for rotation by relative movement between the road gear and frame of the vehicle, said shaft having a flattened surface, an oscillatable piston operating member including an outer member suspended from said shaft, an inner cup in telescopic relation with said outer member and contacting said flattened surface, and a compressed follower spring within said inner cup urging the latter into contact with said shaft, said operating member extending between said pistons so as to selectively actuate one of said pistons to open one of said valves in response to rotation of said shaft.

2. Control means adapted for regulation of the supply and exhaust of air to and from an expansible bellows for a vehicle suspension system to maintain a predetermined height between the road gear and frame of the vehicle, comprising, a housing, said housing having an air supply port, an air exhaust port and a two-way port, with air passageways connecting said supply port with said two-way port and said exhaust port with said two-way port, opposed valves within said housing closing said passageways, opposed pistons located between said valves and movable to open said valves, that portion of the housing between said pistons having walls defining a bore at substantially a right angle to said pistons, said housing further having passageways therethrough connecting the areas between said pistons and said valves with said bore, a liquid completely filling said last named passageways, said areas and said bore, valves in said liquid filled passageways to regulate the size thereof, a shaft extending transversely of said bore adapted for rotation by relative movement between the road gear and frame of the vehicle, said shaft having a flattened surface, an oscillatable piston operating member including an outer member suspended from said shaft, an inner cup in telescopic relation with said outer member and contacting said flattened surface, and a compressed follower spring within said inner cup urging the latter into contact with said shaft, said operating member extending between said pistons so as to selectively actuate one of said pistons to open one of said valves in response to rotation of said shaft.

3. A control device for a vehicle pneumatic suspension system, said system including an air spring containing a cushion of air interposed between the frame and road gear of said vehicle, comprising, a housing adapted for mounting remotely of said air spring, separate and opposed valves in said housing for admitting air to and exhausting air from an air spring, a pair of opposed pistons located between said valves and individually movable within said housing to selectively open said valves, each of said pistons including a resilient cup and a metallic cup holding the lip of said resilient cup against the walls of said housing, said metallic cup having a corrugated portion extending beyond said resilient cup, a rotatable shaft mounted between said pistons, an oscillatable piston operating member operatively connected to said shaft to selectively actuate one of said pistons to open one of said valves upon rotation of said shaft, and damping means opposing the opening of said one of said valves for a predetermined time after actuation of said one of said pistons.

4. A control device according to claim 3 wherein said damping means includes passageways connecting the areas betweeen each associated valve and piston, a liquid completely filling said passageways and said areas, and valves in said passageways to selectively regulate the size thereof.

5. A control device for a vehicle pneumatic suspension system, said system including an air spring containing a cushion of air interposed between the frame and road gear of said vehicle, comprising, a housing adapted for mounting remotely of said air spring, separate and opposed valves in said housing for admitting air to and exhausting air from an air spring, a pair of opposed pistons located between said valves and individually movable within said housing to selectively open said valves, a rotatable shaft mounted between said pistons, an oscillatable piston operating member operatively connected to said shaft to selectively actuate one of said pistons to open one of said valves upon rotation of said shaft, damping means opposing the opening of said one of said valves for a predetermined time after actuation of said one of said pistons, said shaft having a flattened surface, said piston operating member including an outer member suspended from said shaft, an inner cup telescoping within said outer member and contacting said flattened surface of said shaft, and a spring interposed between said inner cup and outer member and having a normal bias urging said inner cup in a direction toward said shaft.

6. A control device for a vehicle pneumatic suspension system comprising, a housing, said housing having conduits therethrough for the passage of air under pressure, opposed valves within said housing closing said conduits, opposed pistons located between said valves and movable within the housing to open said valves, each of said pistons including a resilient cup and a metallic cup holding the lip of said resilient cup against the walls of said housing, said metallic cup having a corrugated portion extending beyond said resilient cup, that portion of the housing between said pistons having walls defining a bore at substantially a right angle to said pistons, a shaft extending transversely of said bore and exteriorly of said housing, oscillatory means within said bore responsive to movement of said shaft, said oscillatory means extending between said pistons so as to selectively actuate said pistons to open said valves, and damping means opposing the opening of said valves for a predetermined time after actuation of said pistons.

References Cited in the file of this patent

UNITED STATES PATENTS

| | | |
|---|---|---|
| 1,371,648 | Schmidt | Mar. 15, 1921 |
| 2,670,201 | Rossman | Feb. 23, 1954 |
| 2,679,865 | Griffith | June 1, 1954 |
| 2,753,891 | Parker | July 10, 1956 |
| 2,774,376 | Young | Dec. 18, 1956 |